J. H. KUHNS.
POT SWEEP.
APPLICATION FILED APR. 21, 1919.
1,323,478.
Patented Dec. 2, 1919.
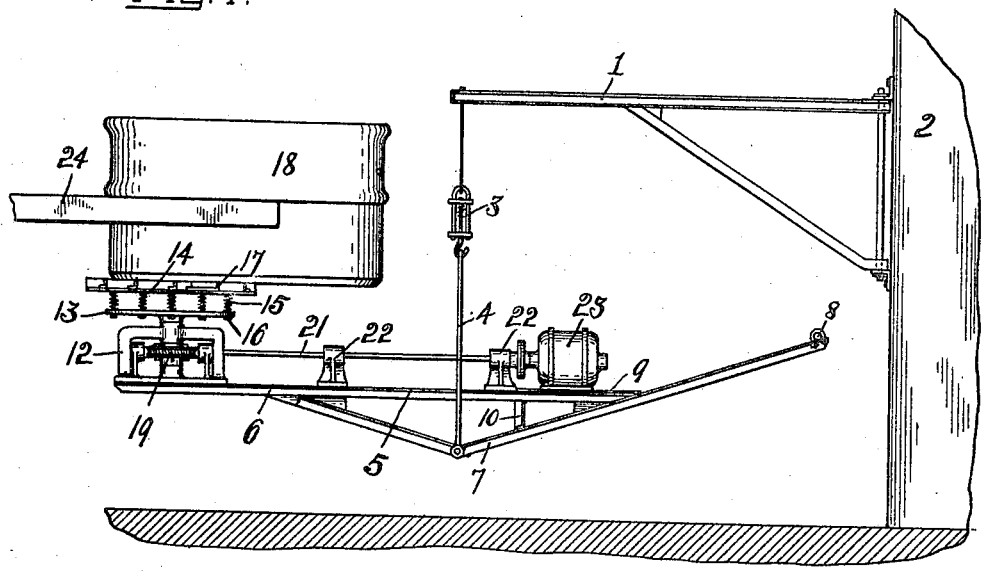
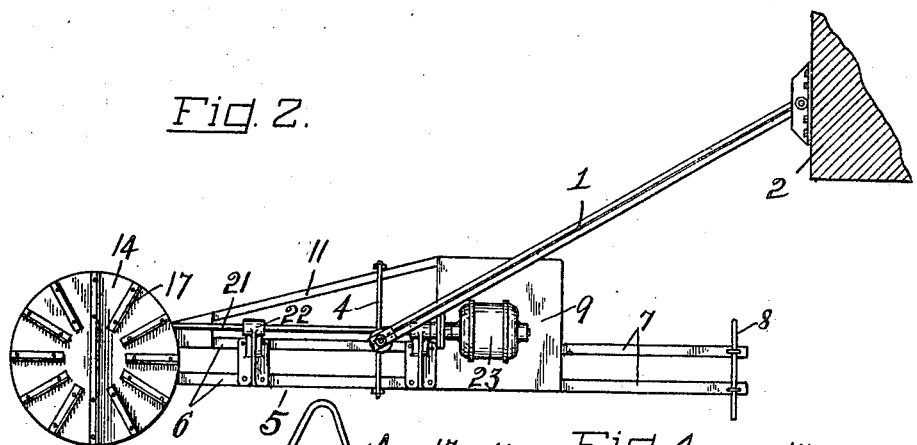
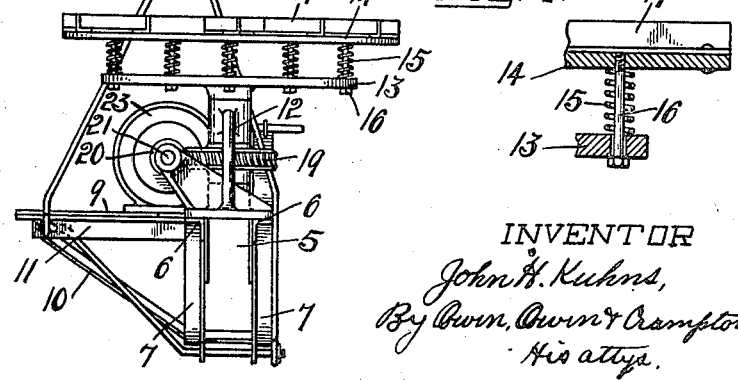
INVENTOR
John H. Kuhns,
By Owen, Owen & Crampton
His attys.

UNITED STATES PATENT OFFICE.

JOHN H. KUHNS, OF TOLEDO, OHIO, ASSIGNOR TO THE EDWARD FORD PLATE GLASS COMPANY, OF ROSSFORD, OHIO, A CORPORATION OF OHIO.

POT-SWEEP.

1,323,478.   Specification of Letters Patent.   Patented Dec. 2, 1919.

Application filed April 21, 1919. Serial No. 291,591.

*To all whom it may concern:*

Be it known that I, JOHN H. KUHNS, a citizen of the United States, and a resident of Toledo, in the county of Lucas and State of Ohio, have invented a certain new and useful Pot-Sweep; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to means particularly intended for use in glass manufacturing plants to scrape or clean the bottoms of glass melting pots free of coal, cinders or other loose matter adhering thereto after removal from the melting furnace and before moving the pot to the pouring point.

In the manufacture of plate glass it is customary to first sprinkle a thin layer or covering of coal, cinders or the like on the floor of the melting furnace before placing therein a pot containing glass to be melted, thus preventing a tendency of the pot to stick to the furnace floor. Upon removing the pot from the furnace preparatory to pouring, a greater or less amount of the coal or cinders on which the pot rests, adheres to the bottom thereof and it is highly important to remove such coal or cinders from the pot before moving it over the table on which the glass is poured, as otherwise some of the foreign matter carried by the pot bottom might fall on the table during the pouring operation and mix with the glass to the injury thereof.

The primary object of my invention is the provision of a simple mechanism for accomplishing the cleaning or scraping of the pot bottom in rapid, economical and efficient manner.

The invention is fully described in the following specification and while in its broader aspect it is capable of embodiment in numerous forms, a preferred embodiment thereof is illustrated in the accompanying drawings, in which,—

Figure 1 is a side elevation of an apparatus embodying the invention in operative cleaning relation to a pot. Fig. 2 is a plan view thereof with the pot removed. Fig. 3 is a front end elevation thereof with the carrying crane removed, and Fig. 4 is an enlarged sectional fragmentary detail of a portion of the scraping member.

Referring to the drawings, 1 designates a crane, which is carried in elevated position for horizontal swinging movements by a wall or other suitable support 2. A spring swivel 3 is suspended from the free end of the crane 1 for free swinging movements relative thereto, and suspended from this swivel is a yoke or bail member 4, which carries a frame 5 of elongated form within its lower portion for vertical swinging movements relative thereto. The frame 5, which may be of any suitable construction, is of narrow beam-like form, comprising in the present instance, the two parallel main stringers or beam members 6 rigidly tied together by suitable cross-pieces and having the V-shaped truss frame 7 at its bottom. The stringers forming the truss frame 7 are extended beyond the rear end of the main stringer 6 and carry a cross-bar 8 at their rear or free ends, which serves as a handle to enable the operator to control the movements of the frame. The stringers 6 are provided on their top near their rear ends with a platform 9 one end of which extends beyond one side of the beam formed by said stringers and is supported at its outer end by a brace bar 10 extending upward and outward from the adjacent side of the truss frame 7. A truss-bar 11 extends outward and rearward from the forward end of the frame 5 to the outer side of the platform 9. The yoke or bail 4 is pivoted at one end to the bar 11 and at its other end to the outer side of the truss frame 7. It will be understood that while I have shown and described a particular form of frame, such form is not essential to the invention and may therefore be varied as desired.

A yoke form of bearing 12 is carried on the top of the frame 5 at its forward end and has a vertical shaft (not shown) journaled therein and provided above the bearing with a rotatable member 13 of disk form in the present instance. A scraper member 14 is carried by the disk 13 and is yieldingly supported and spaced therefrom by a series of coiled compression springs 15, which encircle bolts or screws 16 projecting downward from the member 14 loosely through registering openings in the member 13, said bolts or screws being headed below the member 13 to limit the spacing of the two members. The scraper member 14 is provided on its top surface with a plurality of circularly arranged radially disposed scraping blades 17 of metal, which, upon a rotation of the scraper member in contact with the bottom of a pot 18, are adapted to scrape the same free of coal, cinders or other adhering particles. The scraper is adapted to adjust itself to the surface of the pot bottom irrespective of whether or not the scraper shaft is perpendicular thereto, due to the yieldability of the supporting springs 16.

The scraper shaft carries a worm wheel 19 within the bearing yoke 12 and this is driven by a worm 20 on the end of a shaft 21, which extends rearwardly of the frame through bearings 22 carried thereby and is connected at its rear end to a motor 23 mounted on the platform 9. It is preferable to so position the motor 23 with respect to the point of suspension of the frame 5 by the yoke 4 that the weight of the motor will substantially counterbalance the weight of the scraper means and other parts to the forward end of the frame.

24 designates one of the jaws of a teemer means which is adapted to remove the pot from the furnace, supporting it in suspended position during the scraping operation and to then transfer it to a table and tip it for pouring, as well understood in the art.

It is evident that the operator by grasping the handle 8 of the frame 5 may easily move it into operative relation to the suspended pot 18 and move the rapidly rotating scraper member 14 around the pot bottom to quickly and efficiently clean it of adhering matter.

I wish it understood that my invention is not limited to any specific construction, arrangement or form of the parts, as it is capable of numerous modifications and changes without departing from the spirit of the invention as defined in the claims.

Having thus described my invention, what I claim as new, and desire to secure by Letters Patent, is,—

1. In an apparatus of the class described, a crane, a frame, means suspending the frame intermediate its ends from the crane for universal swinging movements relative thereto and for vertical tilting movements, said frame having a control handle at one end, a vertically disposed shaft carried by the other end portion of the frame, means for driving the shaft, and rotatable scraper means carried by the shaft at its upper end and having a scraper member for engagement with the under surface of an article.

2. In an apparatus of the class described, a horizontally swinging crane, a frame, means yieldingly suspending said frame intermediate its ends from said crane and adapted to permit swinging movements of the frame in different planes, rotatable scraper means carried by said frame at one end thereof, with its axis positioned at an angle with respect to the longitudinal axis of the frame, and means for driving said scraper means located at the opposite end of the frame to the scraper means.

3. In an apparatus of the class described, a horizontally swinging crane, a frame, means yieldingly suspending the frame intermediate its ends from said crane for universal swinging movements relative thereto, said frame having a control handle at one end, a vertically disposed shaft carried by the other end portion of the frame, means for driving said shaft, and rotatable scraper means carried by said shaft at its upper end and having a scraper member which is yieldingly movable to adapt itself to the surface on which it is acting.

4. In an apparatus of the class described, a frame comprising an elongated platform portion and a subjacent V-shaped supporting structure with said structure extended to the rear of the frame and forming handles, swinging suspending means pivotally attached to the substructure of said frame to support the same, a scraper means carried at the opposite end of said frame to the control handle and adapted to have scraping coaction with the under side of a superposed article, and means for driving said scraping means.

5. In an apparatus of the class described, a suspending means mounted for universal swinging movement and including a bail member, a frame projecting through the bail member of said means and pivotally supported thereby for vertical swinging movements, the frame extending at opposite sides of the bail member and having a control handle at one end, rotary scraper means carried by the frame at its opposite end and having a scraper member for acting against the under side of a superposed pot, and a motor mounted on the frame at the side of the bail member adjacent to the control handle and connected to the scraper means to drive the same.

In testimony whereof I have hereunto signed my name to this specification.

JOHN H. KUHNS.